(12) United States Patent
Yamano et al.

(10) Patent No.: US 11,289,829 B2
(45) Date of Patent: Mar. 29, 2022

(54) CONNECTION STRUCTURE FOR SUPERCONDUCTOR WIRES

(71) Applicant: FURUKAWA ELECTRIC CO., LTD., Tokyo (JP)

(72) Inventors: Satoshi Yamano, Tokyo (JP); Akinobu Nakai, Tokyo (JP); Hisaki Sakamoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 11 days.

(21) Appl. No.: 16/488,860

(22) PCT Filed: Feb. 27, 2018

(86) PCT No.: PCT/JP2018/007231
§ 371 (c)(1),
(2) Date: Aug. 26, 2019

(87) PCT Pub. No.: WO2018/155707
PCT Pub. Date: Aug. 30, 2018

(65) Prior Publication Data
US 2019/0379145 A1    Dec. 12, 2019

(30) Foreign Application Priority Data
Feb. 27, 2017   (JP) .............. JP2017-034353

(51) Int. Cl.
*H01R 4/02*    (2006.01)
*H01R 4/68*    (2006.01)
*H01B 12/06*   (2006.01)

(52) U.S. Cl.
CPC ............. *H01R 4/68* (2013.01); *H01B 12/06* (2013.01)

(58) Field of Classification Search
CPC ........ H01B 12/00; H01B 12/02; H01B 12/06; H01B 12/08; H01R 4/68; H01R 4/02; H01L 39/143
See application file for complete search history.

(56) References Cited

U.S. PATENT DOCUMENTS 3,983,521 A * 9/1976 Furuto ............... H01L 39/14
335/216
4,329,539 A * 5/1982 Tanaka ............... H01L 39/14
174/125.1

(Continued)

FOREIGN PATENT DOCUMENTS

CN    87101570 A    12/1988
CN    101971273 A    2/2011
(Continued)

OTHER PUBLICATIONS

International Search Report dated May 1, 2018 for PCT Application No. PCT/JP2018/007231, 2 pages.
(Continued)

*Primary Examiner* — Thanh Tam T Le
(74) *Attorney, Agent, or Firm* — Amin, Turocy & Watson, LLP

(57) ABSTRACT

Provided is a connection structure for superconductor wires, in which two superconductor wires include respective oxide superconducting conductor layers each formed on one surface of a base material. The oxide superconducting conductor layers are conjoined with each other while facing each other at a connected end of each of the two superconductor wires. An embedment material for reinforcement is provided from one of the two superconductor wires to the other one of the two superconductor wires in a thickness direction of the two superconductor wires at the connected end of each of the two superconductor wires.

7 Claims, 10 Drawing Sheets

(56) References Cited

U.S. PATENT DOCUMENTS

| | | | | |
|---|---|---|---|---|
| 5,116,810 | A * | 5/1992 | Joshi | H01L 39/02 427/62 |
| 5,134,040 | A * | 7/1992 | Benz | H01L 39/02 428/646 |
| 5,244,876 | A * | 9/1993 | Preisler | C04B 35/4525 156/158 |
| 5,747,181 | A * | 5/1998 | Raber | H01L 39/02 29/599 |
| 5,798,312 | A * | 8/1998 | Okada | H01F 6/06 505/230 |
| 6,261,708 | B1 * | 7/2001 | Ohashi | C04B 37/005 428/698 |
| 6,308,399 | B1 * | 10/2001 | Zhou | C04B 35/45 29/599 |
| 8,993,485 | B2 * | 3/2015 | Oh | H01L 39/2419 505/300 |
| 9,042,951 | B2 * | 5/2015 | Nomura | H01L 39/143 505/231 |
| 9,362,026 | B2 * | 6/2016 | Takemoto | H01R 43/00 |
| 9,502,159 | B2 * | 11/2016 | Mitsuhashi | H01L 39/2422 |
| 9,691,532 | B2 * | 6/2017 | Tosaka | H02G 15/34 |
| 10,530,070 | B2 * | 1/2020 | Sato | H01R 4/68 |
| 10,541,068 | B2 * | 1/2020 | Nakai | H01L 39/02 |
| 10,706,991 | B2 * | 7/2020 | Ohki | H01L 39/02 |
| 2015/0332812 | A1 | 11/2015 | Takemoto et al. | |

FOREIGN PATENT DOCUMENTS

| | | |
|---|---|---|
| EP | 2728591 A1 | 5/2014 |
| EP | 2741370 A1 | 6/2014 |
| JP | S52124184 A | 10/1977 |
| JP | H06224591 A | 8/1994 |
| JP | 2009016253 A | 1/2009 |
| JP | 5214744 B2 | 6/2013 |
| JP | 2014107149 A | 6/2014 |
| JP | 2015065116 A | 4/2015 |
| JP | 2016157686 A | 9/2016 |

OTHER PUBLICATIONS

Extended European Search Report dated Jun. 17, 2020 for European Patent Application No. 18756606.2, 8 pages.
Office Action dated Apr. 8, 2020 for Chinese Patent Application No. 201880013591.2, 15 pages (with translation).
International Preliminary Report on Patentability dated Aug. 27, 2019 for PCT Application No. PCT/JP2018/007231, 11 pages (with translation).
European Office Action dated Apr. 28, 2021 for European Patent Application No. 18756606.2, 12 pages.
Chinese Office Action dated Dec. 29, 2020 for Chinese Patent Application No. 201880013591.2, 9 pages (including translation).
Office Action dated Aug. 6, 2021 for Chinese Patent Application No. 201880013591.2, 10 pages (including translation).

* cited by examiner

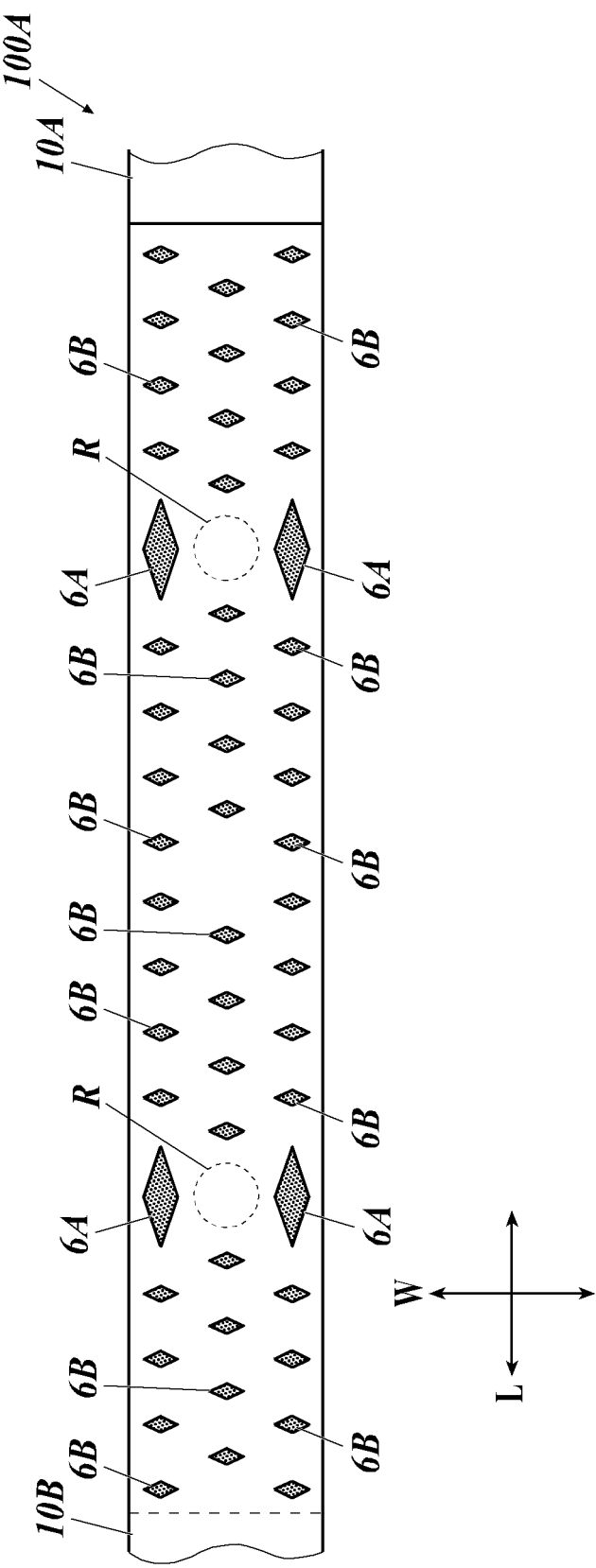

CONNECTION STRUCTURE FOR SUPERCONDUCTOR WIRES

RELATED APPLICATION

The present application is a U.S. National Stage filing under 35 U.S.C. § 371 of international patent cooperation treaty (PCT) application No. PCT/JP2018/007231, filed Feb. 27, 2018, and entitled "CONNECTION STRUCTURE FOR SUPERCONDUCTOR WIRES", which claims the benefit of priority to Japanese Patent Application No. 2017-034353, filed on Feb. 27, 2017, which applications are hereby incorporated into the present application by reference herein in their respective entireties.

TECHNICAL FIELD

The present invention relates to a connection structure for superconductor wires.

BACKGROUND ART

In recent years, oxide superconductors such as YBCO (yttrium-type) and BSCCO (bismuth-type) have been gathering attention as oxide superconductors with a critical temperature (Tc) higher than the liquid nitrogen temperature (about 77K).

Such well-known high temperature oxide superconductor wires include those with a superconducting conductor layer formed by deposition of an oxide superconductor film on a substrate such as a long and flexible metal. An intermediate layer may be provided between the substrate and the superconducting conductor layer as necessary.

As a connection method for the above-described superconductor wires, Patent Literature 1 describes a connection method of exposing the oxide superconductor included in a sheath of the two superconductor wires to be connected, applying MOD liquid based on MOD method (Metal Organic Deposition method) on the exposed surface and baking the exposed surfaces attached to each other to connect two superconductor wires through the superconducting film formed from the MOD liquid.

Patent Literature 2 describes a connection method of exposing a superconducting conductor layer of two superconductor wires in which the superconducting conductor layer is formed on an upper surface of a substrate with a buffer layer in between, and heating the superconducting conductor layers to a melting point with the superconducting conductor layers closely attached to each other to melt and spread the superconducting conductor layers to connect the two superconductor wires.

CITATION LIST

Patent Literature

Patent Literature 1 JP 2009-016253 A
Patent Literature 2 JP 5214744 B2

SUMMARY OF INVENTION

Technical Problem

When the superconductor wire is used in a winded state as in a coil, electromagnetic force is generated outward in the radial direction of a coil in electrification and tension is generated in the longitudinal direction of the superconductor wire. Also in forming a coil, the wire is wound as tension is added in the longitudinal direction of the superconductor wire.

In manufacturing a superconductor cable from the superconductor wire, the superconductor wire is furnished along the longitudinal direction of the cable or in a spiral around a former, and tension is generated in the longitudinal direction in the superconductor wire.

Accordingly, the connection structures for the superconductor wires need strength against the tension in the longitudinal direction. However, in the connection structures in Patent Literatures 1 and 2, as the connection strength is provided by the superconductor conducting layer, the strength against the tension is not adequately obtained and the superconductor layer is subject to peeling or corruption at the connected portion. Thus, problematically, the connection structures in Patent Literatures 1 and 2 are not durable for use as a coil or a cable.

On the other hand, the connection strength may be obtained by: a method of holding the connected portions of the superconductor wires in between with another material with strength to obtain the connection strength while protecting the superconductor conducting layers at the connected portion; or a method of conjoining the base materials of the superconductor wires at the connected portions with another material with strength.

However, these methods are hard to be used in a winded state as in a coil because the connected portion of the superconductor wires is larger than the rest. They are not appropriate to be used for a superconductor cable, either, because effects such as electric field concentration are caused due to the unevenness.

An object of the present invention is to provide a connection structure for superconductor wires which is small or thin with connection strength.

Solution to Problem

In order to solve the above-described problem, the invention of claim 1 provides a connection structure for superconductor wires, in which two superconductor wires include respective oxide superconducting conductor layers each formed on one surface of a base material, wherein the oxide superconducting conductor layers are conjoined with each other while facing each other at a connected end of each of the two superconductor wires, and wherein an embedment material for reinforcement is provided from one of the two superconductor wires to the other one of the two superconductor wires in a thickness direction of the two superconductor wires at the connected end of each of the two superconductor wires.

The invention of claim 2 provides the connection structure for the superconductor wires according to claim 1, wherein the embedment material for reinforcement fills a hole or a notch which penetrates at least one of the superconductor wires through a back surface opposite to a film forming surface of the superconductor conducting layer of the base material.

The invention of claim 3 provides the connection structure for the superconductor wires according to claim 2, wherein the embedment material for reinforcement fills the hole or the notch penetrating through the back surface, and wherein the embedment material for reinforcement is formed to be a layer on the back surface around the hole or the notch.

The invention of claim 4 provides the connection structure for the superconductor wires according to any one of claims 1 to 3, wherein the embedment material for reinforcement is positioned at both edges in a width direction of the two superconductor wires.

The invention of claim 5 provides the connection structure for the superconductor wires according to any one of claims 1 to 4, wherein a shape of the embedment material for reinforcement viewed from a direction perpendicular to a plane of the base material of the two superconductor wires is a shape longer in the longitudinal direction and narrower toward both ends in the longitudinal direction.

The invention of claim 6 provides the connection structure for the superconductor wires according to claim 5, wherein the embedment material for reinforcement which is in the shape longer in the longitudinal direction of the two superconductor wires and narrower toward the both ends in the longitudinal direction is formed at both edges in a width direction of the superconductor wires.

The invention of claim 7 provides the connection structure for the superconductor wires according to any one of claims 1 to 6, wherein the embedment material for reinforcement is formed with a resin or a low-melting metal.

Advantageous Effects of Invention

In the present invention, a connection structure for superconductor wires which is small or thin with connection strength may be provided according to the above-described configurations.

BRIEF DESCRIPTION OF DRAWINGS

FIG. 6A is a plane view of the connection structure for the superconductor wires which is partly modified, according to the second embodiment.

DESCRIPTION OF EMBODIMENTS

First Embodiment

Figure 1:
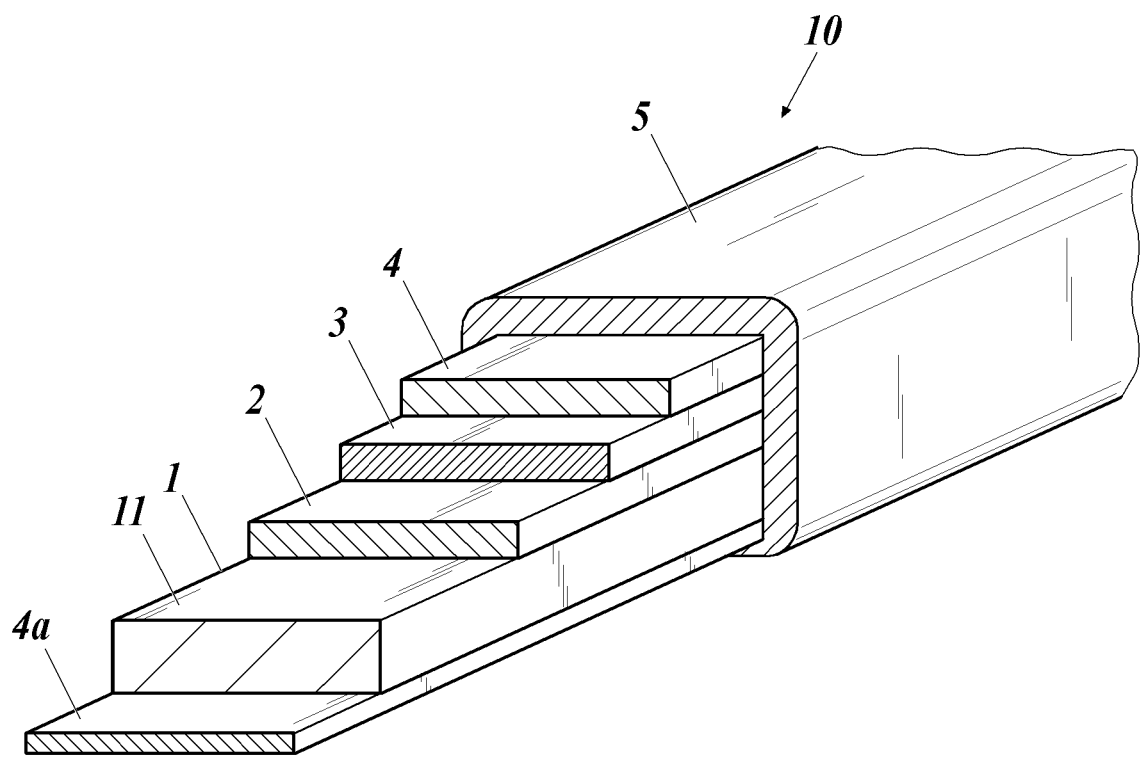
FIG. 1 is a perspective view of a superconductor wire.

Hereinafter, the preferred first embodiment of the present invention is described with reference to the drawings. The embodiments described below include various limitations technically preferable to implement the present invention. However, the scope of the present invention is not limited to the embodiments described below and the illustrated examples. In the drawings, the same reference signs are applied to the same or corresponding components, and redundant description is omitted. The drawings are schematically illustrated, and it is necessary to understand that the relation of the size of each element may be different from the actual size. The relation and the ratio of the size may also be different among the drawings.

[Superconductor Wire]

The connection structure for the superconductor wires is described in the present embodiment.

FIG. 1 is a perspective view showing a structure for the superconductor wire 10 to be connected.

As shown in FIG. 1, in the superconductor wire 10, an intermediate layer 2, an oxide superconducting conductor layer 3, and an internal protection layer 4 are layered in this order on one main surface (hereinafter referred to as a film forming surface 11) in the thickness direction of a superconducting film forming base material 1 (hereinafter referred to as a "base material 1"). An internal protection layer 4a is formed on a surface opposite to the film forming surface 11 of the base material 1 (hereinafter referred to as a "back surface 12" (see FIG. 3)). That is, the superconductor wire 10 has a layered structure including the internal protection layer 4a, the base material 1, the intermediate layer 2, the oxide superconducting conductor layer 3 (hereinafter referred to as a "superconducting conductor layer 3"), and the internal protection layer 4. Further, an external protection layer 5 (a stabilizing layer) which covers the overall periphery of this layered structure is provided.

The internal protection layers 4, 4a and the external protection layer 5 are not shown in the drawings except in FIG. 1.

A tape-shaped low magnetic metallic substrate is used as the base material 1. Used for the metallic substrate is, for example, a metal which has excellent strength and heat resistance such as Co, Cu, Cr, Ni, Ti, Mo, Nb, Ta, W, Mn, Fe, and Ag, or an alloy thereof. Specifically, from the viewpoint of excellent corrosion resistance and heat resistance, it is preferable to use an Ni based alloy such as Hastelloy (registered trademark) and Inconel (registered trademark) or an Fe based alloy such as stainless steel.

Moreover, various ceramics may be provided on these various metallic material.

The thickness of the base material 1 is, for example, about 50 μm (The value of the thickness is merely an example which is not limitative, and the same can be said about the examples of the thickness of the other layers of the RE-type superconductor wire 10).

The film forming surface 11 is substantially a flat and smooth surface, and preferably, the surface roughness of the film forming surface 11 is 10 nm or less.

The surface roughness is the arithmetic average roughness Ra in the "amplitude average parameter in a height direction" in the surface roughness parameter defined in JISB-0601-2001.

The intermediate layer 2 is a layer to realize, for example, high biaxial orientation in the superconducting conductor layer 3. For example, physical characteristic values such as a thermal expansion coefficient, and grating constant of the intermediate layer 2 show intermediate values between values of the base material 1 and the superconducting conductor forming the superconducting conductor layer 3.

The intermediate layer 2 may be of a single layer structure or a multi-layer structure. When a multi-layer structure is employed, the number of layers and the type of layer are not limited. The structure may include: a bed layer including amorphous material such as $Gd_2Zr_2O_{7-\delta}$ ($\delta$ is oxygen non-stoichiometric amount), $Al_2O_3$, and $Y_2O_3$; a forced orientation layer including a crystalline material such as MgO and formed with an IBAD (Ion Beam Assisted Deposition) method; and a LMO layer including $LaMnO_{3+\delta}$ ($\delta$ is oxygen non-stoichiometric amount), which are layered in order. Further, a cap layer including $CeO_2$ may be provided on the LMO layer.

In regard to the thickness of each layer, the LMO layer is to be 30 nm, the MgO layer as the forced orientation layer is to be 40 nm, the $Y_2O_3$ layer as the bed layer is to be 7 nm, and the $Al_2O_3$ layer is to be 80 nm. These values are merely an example.

Preferably, the intermediate layer 2 includes an $Al_2O_3$ (alumina) layer regardless of whether a single-layer structure or a multi-layer structure is employed.

The superconducting conductor layer 3 is layered on the surface of the intermediate layer 2. An oxide superconducting conductor, specifically a copper-oxide superconducting conductor, is preferably included in the superconducting conductor layer 3. $REBa_2Cu_3O_{7-\delta}$ (hereinafter referred to as RE-type superconductor) as a high temperature superconducting conductor is preferable as the copper-oxide superconducting conductor. RE in the RE-type superconductor may be a single rare earth element or a plurality of rare earth elements such as Y, Nd, Sm, Eu, Gd, Dy, Ho, Er, Tm, Yb, and Lu, and among the above, Y is especially preferable due to the reason that substitution with the Ba site hardly occurs. Further, $\delta$ is the oxygen non-stoichiometric amount. For example, the oxygen non-stoichiometric amount is 0 or more and 1 or less, and it is more preferable that the value becomes closer to 0 because the superconducting transfer temperature is higher. When high pressure oxygen annealing, etc. is performed using an apparatus such as an autoclave, the oxygen non-stoichiometric amount $\delta$ may be less than 0, that is, a negative value.

The thickness of the superconducting conductor layer 3 is, for example, about 1 μm.

The internal protection layers 4, 4a cover the surface of the superconducting conductor layer 3 and the back surface 12 of the base material 1, but preferably, the internal protection layers 4, 4a cover the overall periphery of the base material 1, the intermediate layer 2, and the superconducting conductor layer 3.

The internal protection layers 4, 4a may be of a single layer structure or a multi-layer structure. When a multi-layer structure is employed, the number of layers and the type of layer is not limited, and the structure may include a silver protection layer including silver and a copper protection layer including copper layered in order.

When a single layer structure is employed, it is preferably a layer of good conductor metal including at least one of Ag, Au, and Cu. Here, the internal protection layers 4, 4a are Ag, for example.

Further, in the present embodiment, the internal protection layers 4, 4a cover the surface of the superconducting conductor layer 3 and the back surface 12 of the base material 1, though not limited. In some cases, the internal protection layers 4, 4a cover the surface of the superconducting conductor layer 3 only.

The internal protection layer 4 on the side of the superconducting conductor layer 3 has a thickness of about 2 μm, for example, and the internal protection layer 4a on the side of the base material 1 has a thickness of about 1.8 μm, for example. That is, the internal protection layer 4a on the side of the base material 1 is formed to be thinner. However, the internal protection layer 4 and the internal protection layer 4a may be formed to have the same thickness.

The external protection layer 5 is formed to cover the upper and lower surfaces and the left and right surfaces in FIG. 1 of the layered body including the internal protection layer 4a, the base material 1, the intermediate layer 2, the superconducting conductor layer 3, and the internal protection layer 4 along the entire length of the RE-type superconductor wire 10.

The external protection layer 5 is formed to have a thickness of about 20 μm in the upper to lower and the left to right directions.

The external protection layer 5 is a silver stabilizing layer of Ag. This stabilizing layer may be of a single layer structure or a multi-layer structure. When a multi-layer structure is employed, the number of layers and the type of layer is not limited.

The external protection layer 5 may be a copper stabilizing layer including copper, or a silver stabilizing layer and a copper stabilizing layer layered in order.

[Connection Structure for Superconductor Wires]

Figure 2A:
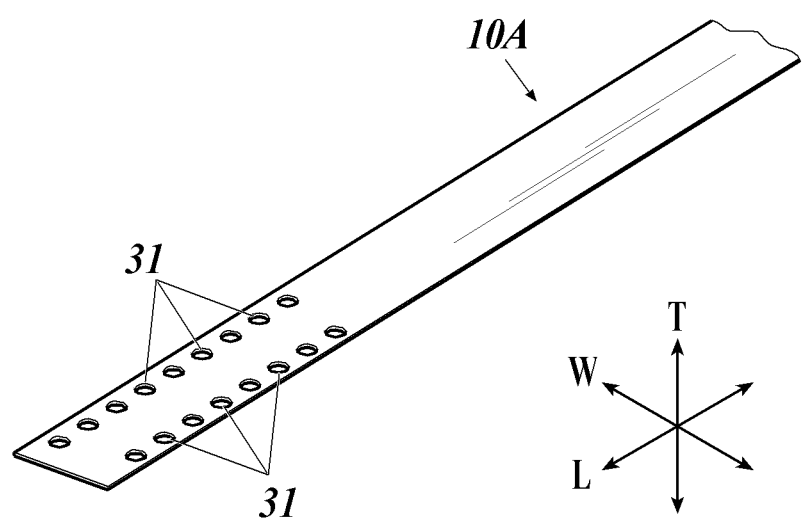
FIG. 2A is a perspective view showing the first step of a connection method to form a connection structure for the superconductor wires according to the first embodiment.
Figure 2B:
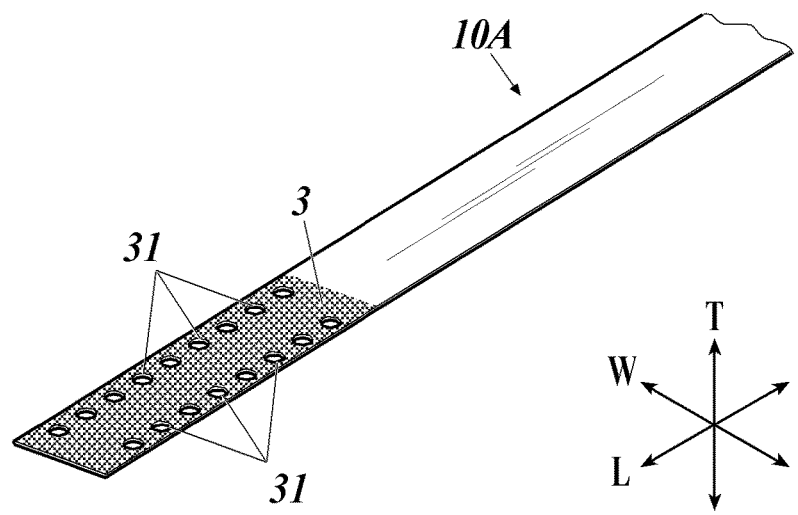
FIG. 2B is a perspective view showing the step following FIG. 2A of the connection method to form the connection structure for the superconductor wires according to the first embodiment.
Figure 2C:
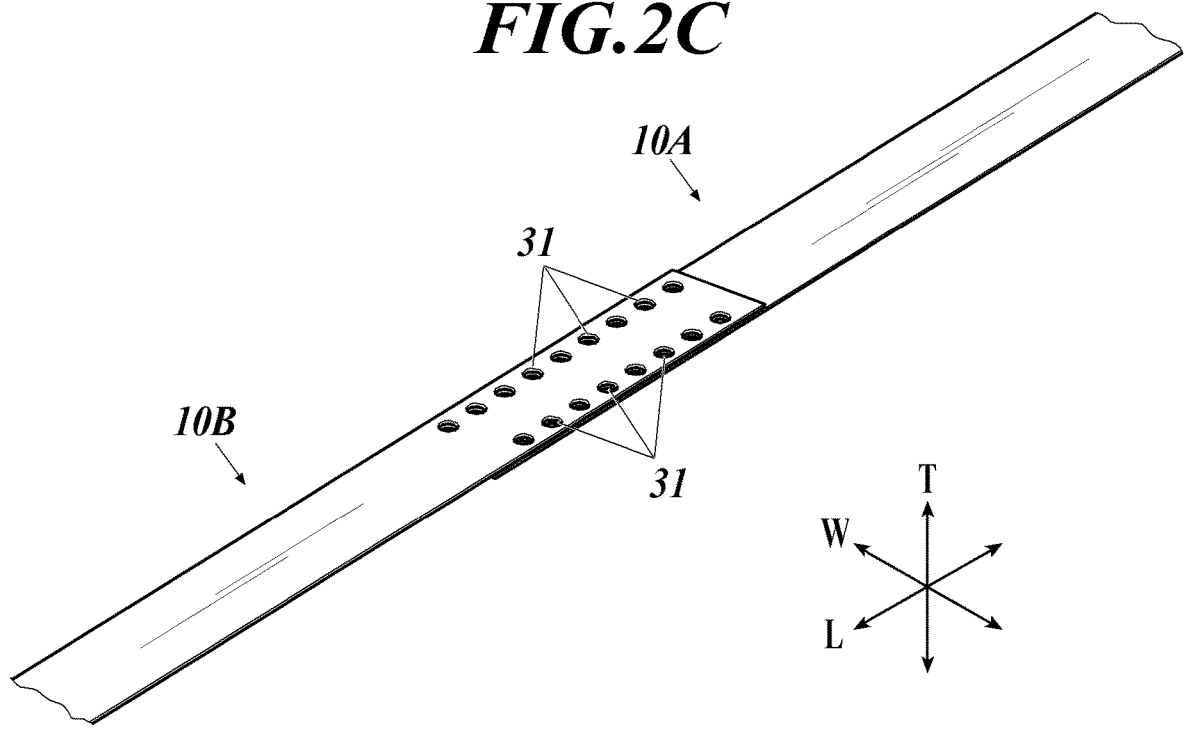
FIG. 2C is a perspective view showing the step following FIG. 2B of the connection method to form the connection structure for the superconductor wires according to the first embodiment.

FIGS. 2A to 2D are perspective views of the superconductor wire(s) showing step by step the connection method in the connection structure 100 for the superconductor wires. FIG. 3A is a cross-sectional view showing the superconductor wire on the plane parallel to the longitudinal direction and the thickness direction in the connection structure 100.

In the description below, the longitudinal direction of the superconductor wire 10 is represented as L, the thickness direction as T, and the width direction (shorter direction) as W.

Figure 2D:
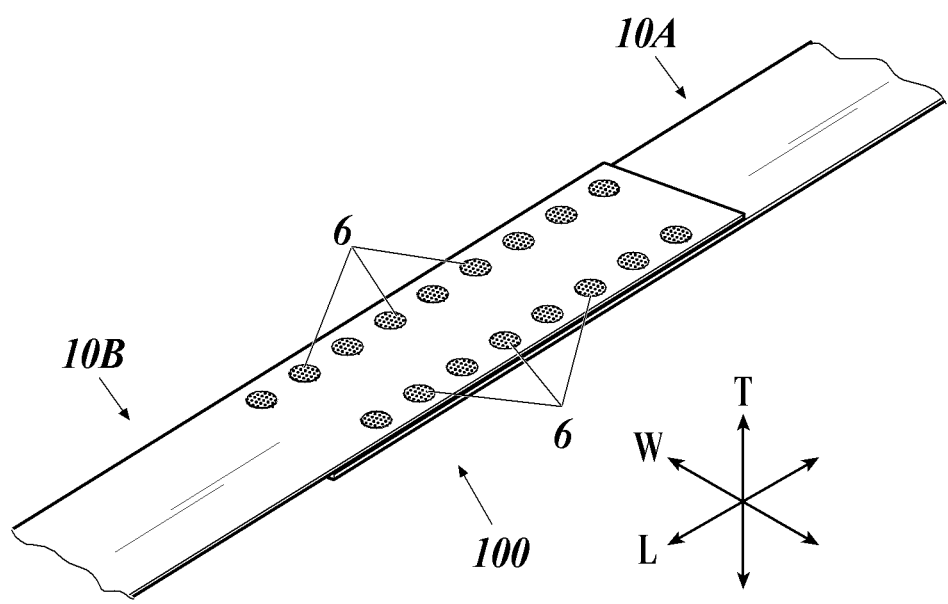
FIG. 2D is a perspective view showing the step following FIG. 2C of the connection method to form the connection structure for the superconductor wires according to the first embodiment.
Figure 3A:
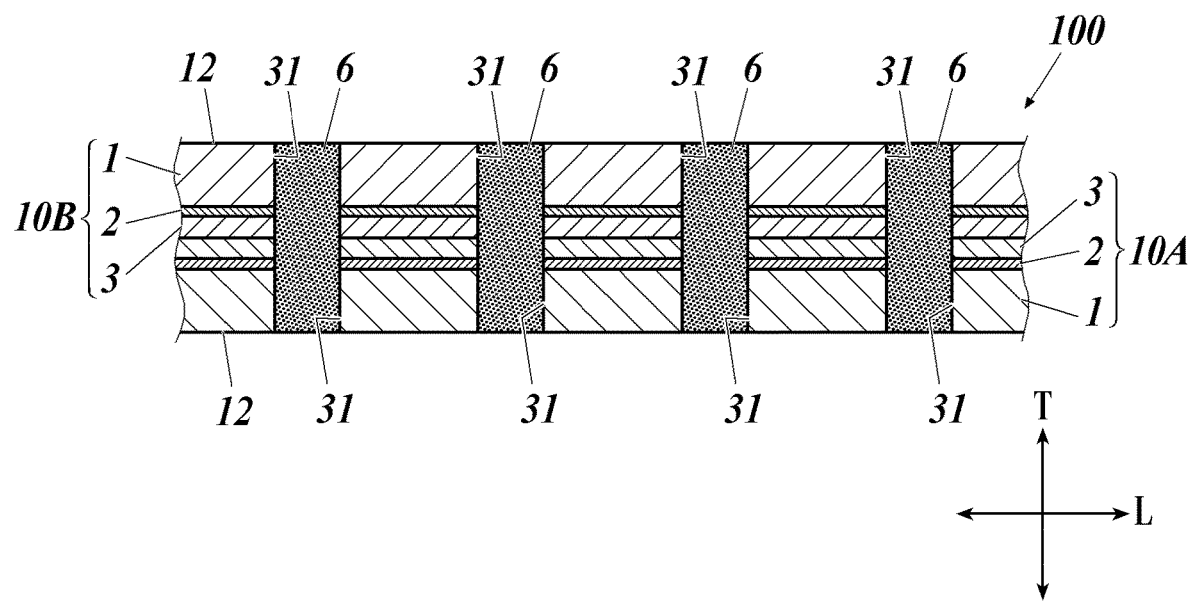
FIG. 3A is a cross-sectional view of the connection structure for the superconductor wires in the longitudinal direction and in the thickness direction.

In the connection structure 100 for the superconductor wires of the present embodiment, the internal protection layers 4, 4a and the external protection layer 5 are removed at the connected ends of the first superconductor wire 10A and the second superconductor wire 10B, and the exposed superconducting conductor layers 3 are conjoined while facing each other, as shown in FIGS. 2D and 3A.

At the ends of the first and second superconductor wires 10 A and 10B connected to each other, an embedment material 6 for reinforcement is provided in the thickness direction T from the first superconductor wire 10A to the second superconductor wire 10B.

Figure 3B:
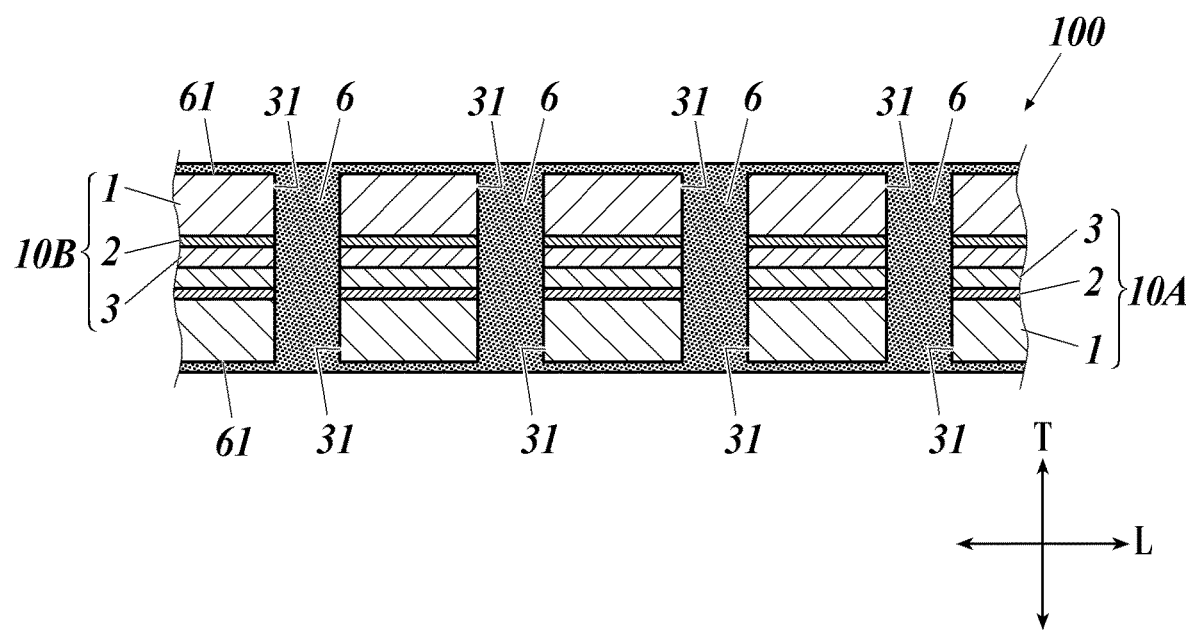
FIG. 3B is a cross-sectional view of the connection structure for the superconductor wires which has an embedment material layer for reinforcement in the longitudinal direction and in the thickness direction.

In FIGS. 3A and 3B, the length of the embedment material 6 for reinforcement in the longitudinal direction L is smaller than the length in the thickness direction T for explanation, but actually the length of the embedment material 6 for reinforcement in the longitudinal direction L is larger than the length in the thickness direction T.

More specifically, multiple through holes 31 penetrating the base material 1, the intermediate layer 2, and the superconducting conductor layer 3 are provided at each of the connected ends of the first superconductor wire 10A and the second superconductor wire 10B. Though the through holes 31 may be in any shape, they are in a round shape here, for example.

The multiple through holes 31 are formed in line along the longitudinal direction L at the both edges in the width direction W of the first and second superconductor wires 10A and 10B.

The first superconductor wire 10A and the second superconductor wire 10B are formed such that the positions of the through holes 31 of the first superconductor wire 10A correspond to the positions of the through holes 31 of the second superconductor wire 10B, with the superconducting conductor layers 3 facing each other.

The embedment materials 6 for reinforcement fill the through holes 31 which correspond to each other in size and position from the first superconductor wire 10A to the second superconductor wire 10B, such that there is no extra space inside, as shown in FIG. 3A. The embedment materials 6 for reinforcement fill the through holes 31 on the back surfaces 12 of the base materials 1 of the superconductor wires 10A and 10B to be substantially flush with the back surfaces 12.

The embedment material 6 for reinforcement is a resin or low-melting metal having a higher shear tolerance than at least the material forming the superconducting conductor layer 3. Epoxy resin, amide resin, etc. which have low temperature resistance and strength are more preferable when the embedment material 6 for reinforcement is formed with resin, because the superconductor wires 10A and 10B are used at an extremely low temperature. When the embedment material 6 for reinforcement is formed with low-melting metal, solder is more preferable so that the heating temperature in filling is lowered.

[Connection Method for Superconductor Wires]

The connection method for the superconductor wires to form the above-described connection structure 100 is described with reference to FIGS. 2A to 2D. In FIGS. 2A and 2B, the second superconductor wire 10B is omitted from the drawings.

First, at the connected ends of the first and second superconductor wires 10A and 10B, multiple through holes 31 are formed (step of forming through holes), as shown in FIG. 2A.

Each of the through holes 31 is formed by etching or laser processing. When the step of forming the through holes is performed by etching, the step includes a step of forming a mask to keep the portions other than the through holes 31 in the first and second superconductor wires 10A and 10B and a step of removing each layer at the positions of the through holes 31 according to the mask.

Next, at the connected ends of the first and second superconductor wires 10A and 10B, the external protection layer 5 and the internal protection layers 4, 4a are removed to expose the superconducting conductor layers 3, 3, as shown in FIG. 2B (step of removing protection layers). The removal of the external protection layer 5 and the internal protection layers 4, 4a is done by mechanical polishing, chemical polishing, or a combination thereof.

Preferably, the surface roughness of the superconducting conductor layer 3 exposed by peeling of the internal protection layer 4 is preferably smaller (for example, about 10 nm) so that the superconducting conductor layers are conjoined in a good state.

Next, as shown in FIG. 2C, the superconducting conductor layers 3, 3 are conjoined with each other such that the positions of the through holes 31 of the superconducting conductor layer 3 of the first superconductor wire 10A correspond to the positions of the through holes 31 of the superconducting conductor layer 3 of the second superconductor wires 10B while the exposed planar surfaces of the superconducting conductor layers 3, 3 of the first and second superconductor wires 10A, 10B are facing each other (conjoining step).

Here, they are conjoined as a superconducting conductor (not illustrated) is formed by the MOD method (Metal Organic Deposition method) between the superconducting conductor layers 3, 3 of the first and second superconductor wires 10A, 10B.

To that end, the above-described conjoining step includes a step of applying the MOD liquid which is to be a precursor of the superconducting conductor according to the MOD method on either one or both of the surface of the superconducting conductor layer 3 of the first superconductor wire 10A and the surface of the superconducting conductor layer 3 of the second superconductor wire 10B.

For example, the above-described MOD liquid used is an acetylacetonate type solution including RE (rare earth element such as Y (yttrium), Gd (gadolinium), Sm (samarium), and Ho (holmium)), Ba, and Cu in a ratio of about 1:2:3.

Further, the above-described conjoining step includes a preliminary baking step to remove organic components included in the MOD liquid applied to either one or both of the first superconductor wire 10A and the second superconductor wire 10B, and a main baking step to conjoin the superconducting conductor layers 3, 3 by epitaxial growth at the interface of the superconducting conductor layers 3, 3 of the first and second superconductor wires 10A, 10B.

In the above-described preliminary baking step, thermal processing is performed within the temperature range of 400° C. or higher and 500° C. or lower while pressure is being applied to the conjoined portion of the first and second superconductor wires 10A, 10B within the range of 10 to 100 MPa.

In the main baking step, thermal processing is performed within the temperature range of 780'C or higher and 830° C. or lower while pressure is being applied to the conjoined portion of the first and second superconductor wires 10A, 10B within the range of 10 to 100 MPa.

Such pressure conditions and temperature conditions are merely an example and the range of the values are not limited thereto.

Next, as shown in FIG. 2D, the embedment materials 6 for reinforcement before hardening fill the through holes 31 of the first and second superconductor wires 10A and 10B (step of filling).

When epoxy resin or amide resin is used as the embedment material 6 for reinforcement, the material in a state before being hardened by addition of a curing agent is used in filling. When solder is used as the embedment material 6 for reinforcement, solder in a heated and melted state is used in filling.

An excess part of the material may be removed from the embedment material 6 for reinforcement filling the through holes 31 so that the embedment material 6 for reinforcement is almost flush with the back surfaces 12 of the base material 1 of the superconductor wires 10A and 10B.

As shown in FIG. 3B, the excess part of the embedment material 6 for reinforcement may be extended to be a layer on the back surface 12 of the base materials 1 of the superconductor wires 10A and 10B to form an embedment material layer 61 around the through holes 31.

In the above-described connection method for the superconductor wires, the step of forming the through holes is performed first, for example, but the step of forming the through holes may be performed next to the step of removing the protection layers or next to the conjoining step.

[Technological Effects of First Embodiment]

In the above-described connection structure 100 for the superconductor wires, the superconducting conductor layers 3 of the first superconductor wire 10A and the second superconductor wire 10B are conjoined with each other while facing each other, and the embedment material 6 for reinforcement is provided from the first superconductor wire 10A to the second superconductor wire 10B in the thickness direction T.

Thus, when tension is added in the longitudinal direction of the superconductor wires 10A and 10B, shear tolerance is added to the embedment material 6 for reinforcement and shear stress added to the conjoined portion of the superconducting conductor layers 3 may be lowered. As a result, the connection strength of the conjoined portion of the superconducting conductor layers 3 may be kept high.

Accordingly, even when tension is added to the superconductor wires 10 in manufacturing of a superconducting coil or a superconducting cable or in electrification, the connection structure 100 may be prevented from being disrupted, and the superconductive connection may be kept in a good state.

As the embedment material 6 for reinforcement is embedded from the first superconductor wire 10A to the second superconductor wire 10B, enlargement or thickening of the connection structure 100 for the superconductor wires may be suppressed. As a result, generation of electric field concentration may be suppressed in electrification. Further, when coil winding is done with the superconductor wires 10 with the connection structure 100 for the superconductor wires, it may be in a similar way as when it is done with the superconductor wire 10 without the connection structure 100.

As the embedment materials 6 for reinforcement fill the through holes 31 which penetrate the first and second superconductor wires 10A and 10B through the back surfaces 12 of the materials 1, the connection strength of the first and second superconductor wires 10A and 10B may be kept higher.

With a configuration where the embedment material 6 for reinforcement has the embedment material layer 61 formed in a layered state on the back surface 12 of the base material 1 around the through holes 31, the connection strength of the first and second superconductor wires 10A and 10 B may be kept even higher.

In the connection structure 100 for the superconductor wires, the embedment material 6 for reinforcement is provided at the both edges in the width direction W of the superconductor wires 10A and 10B.

As the first and second superconductor wires 10A and 10B have the base material 1, the intermediate layer 2, and the superconducting conductor layer 3 in a layered state, they are curved to be concave (or convex) such that the central part is recessed (or protruding) compared to the edges in the width direction because of difference in the expansion rate of the material forming each layer. Thus, the connection structure 100 for the superconductor wires may be subject to peeling or cracking at the both edges in the width direction W. However, with the embedment material 6 for reinforcement provided at the both edges in the width direction W, peeling or cracking in the superconductor wires may be decreased effectively and the connection may be kept in a good state.

When the embedment material 6 for reinforcement is formed with resin such as epoxy resin and amide resin, it may be formed at a room temperature or at a relatively low temperature. Accordingly, effects of heating on the superconductor wires 10A and 10B may be prevented while the embedment material 6 for reinforcement is formed easily.

When the embedment material 6 for reinforcement is low-melting metal such as solder, it may be formed at a relatively low temperature. Accordingly, effects of heating on the superconductor wires 10A and 10B may be prevented while the embedment material 6 for reinforcement is formed easily.

Because of those features, the connection strength in the connection structure 100 of the superconductor wires may be kept high.

Second Embodiment

In the connection structure 100 for the superconductor wires, the embedment material 6 for reinforcement is in a round shape viewed from the thickness direction T, for example, but the shape is not limited thereto.

Figure 4A:
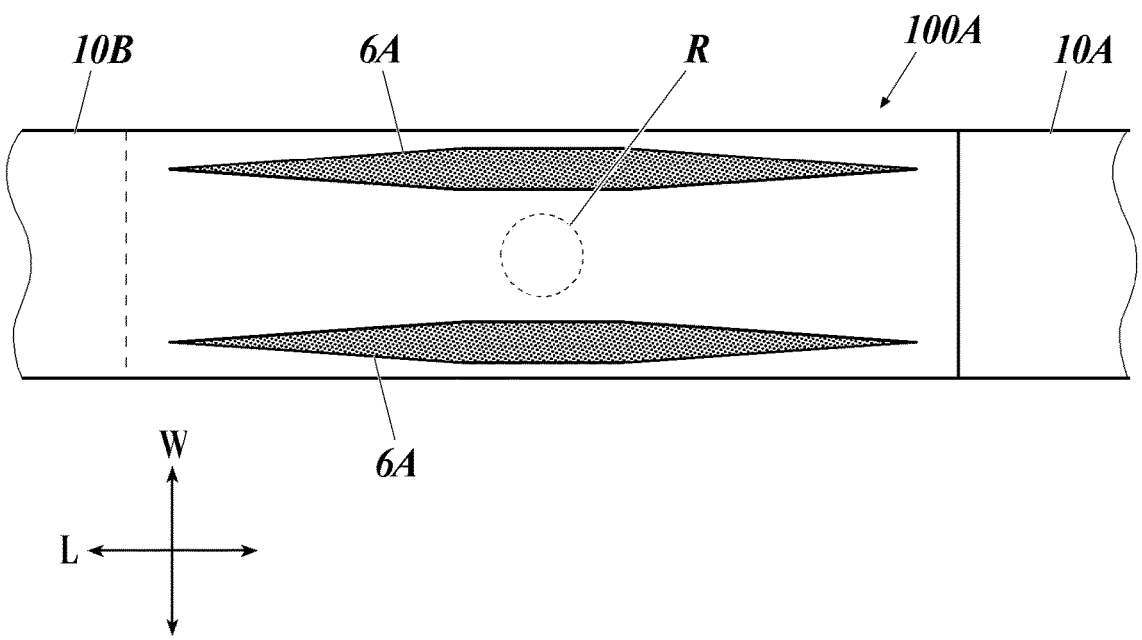
FIG. 4A is a plane view of the connection structure for the superconductor wires according to the second embodiment.
Figure 4B:
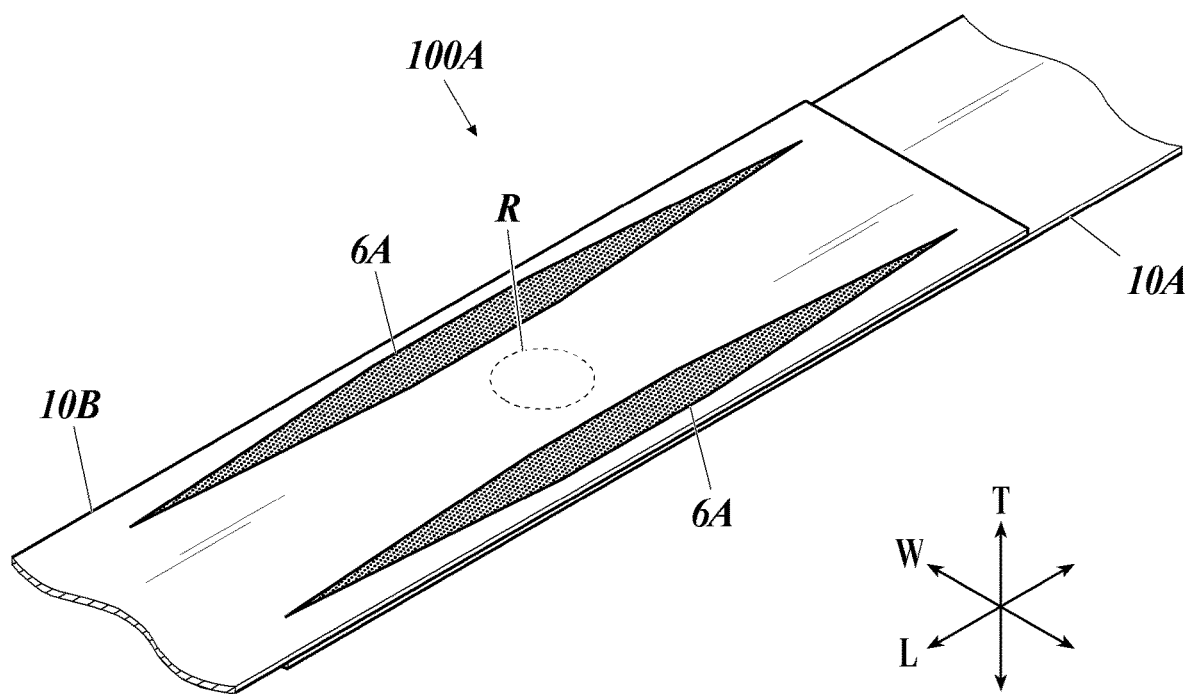
FIG. 4B is a perspective view of the connection structure for the superconductor wires according to the second embodiment.

For example, the shape viewed from the direction perpendicular to the plane of the base material of the first and second superconductor wires 10A and 10B may be in a shape longer in the longitudinal direction L of the superconductor wires and narrower toward the both ends, similarly to that of the embedment material 6A for reinforcement in the connection structure 100A for the superconductor wires shown in FIGS. 4A and 4B.

The embedment material 6A for reinforcement is formed with the same material and by the same method as the above-described embedment material 6 for reinforcement.

When the embedment material 6A for reinforcement is in a shape which has the maximum length in the width direction W at the central part in the longitudinal direction L and has a length gradually decreasing toward the both edges in the longitudinal direction L, the embedment material 6A for reinforcement has the flexural rigidity which is the highest at the central part in the longitudinal direction L and which gradually decreases toward the both ends.

Thus, in the connection structure 100A for the superconductor wires, when flexural strength is added such that there is winding or bending in the longitudinal direction L, the flexural amount at the central part may be decreased as the embedment material 6A for reinforcement is curved at the both edges in the longitudinal direction L.

Accordingly, even when there is bending in the connection structure 100A for the superconductor wires, the connection strength of the superconducting conductor layers 3 of the first and second superconductor wires 10A and 10 B may be kept high around the central part in the longitudinal direction of the embedment material 6A for reinforcement, and the superconductive connection may be kept in a good state.

Especially, with two above-mentioned embedment materials 6A for reinforcement provided alongside in the width direction W, the connection strength may be kept high against the wire bending especially in an area R between the central parts in the longitudinal direction L of the two embedment materials 6A for reinforcement of the superconducting conductor layers 3 of the first and second superconductor wires 10A and 10B, and the superconductive connection may be kept in a good state in the area R.

It is preferable that the superconductive connection is kept in a good state on the overall conjoined face of the superconducting conductor layers 3 of the first and second superconductor wires 10A and 10B. However, even when there is wire bending, the superconductive connection 100A may be stably kept in a good state for a long term and the reliability may be improved, as long as the superconductive connection is kept in a good state at least partially as in the above-mentioned area R.

Figure 5A:
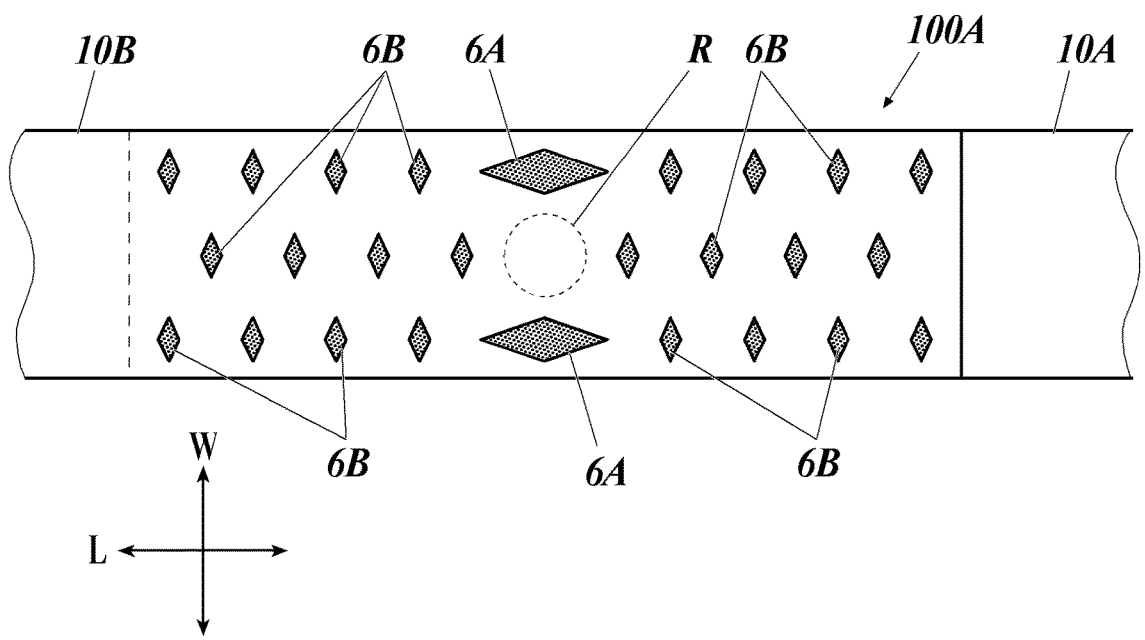
FIG. 5A is a plane view of the connection structure for the superconductor wires which is partly modified, according to the second embodiment.
Figure 5B:
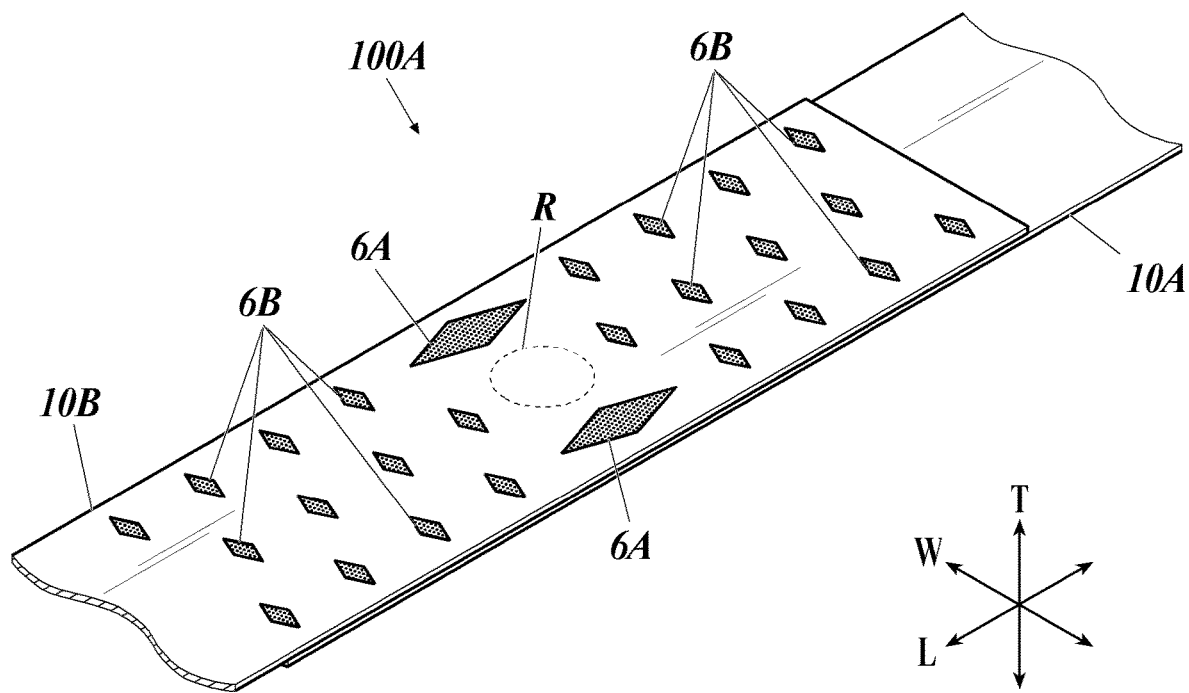
FIG. 5B is a perspective view of the connection structure for the superconductor wires which is partly modified, according to the second embodiment.

As shown in FIGS. 5A and 5B, a pair of the embedment materials 6A for reinforcement may be provided at the central part in the longitudinal direction L in the connection structure 100A for the superconductor wires, and on the both sides of the pair of the embedment material 6A for reinforcement, multiple embedment materials 6B for reinforcement smaller than the embedment materials 6A for reinforcement may be dispersedly provided.

The embedment material 6B for reinforcement is formed with the same material and by the same method as the above-described embedment material 6 for reinforcement.

In that case, the embedment material 6B for reinforcement may be in the same shape as the embedment material 6A for reinforcement, though it may be formed such that the longitudinal side of the embedment material 6B for reinforcement is in a direction (for example, in the width direction) different from that of the embedment material 6A for reinforcement. This enables the structure which adds to the connection strength of the superconducting conductor layers 3 against warping in a direction different from the embedment material 6A for reinforcement.

The embedment material 6B for reinforcement may be in any shape other than the above-described shape. Even in that case, the areas with the high connection strength are dispersedly provided in the connection structure 100A for the superconductor wires. Thus, the superconductive connection of the superconducting conductor layers 3 may also be stably kept in a good state with one or some of the embedment materials 6B against warping in various directions different from the embedment material 6A for reinforcement, and the reliability may be improved.

Figure 6B:
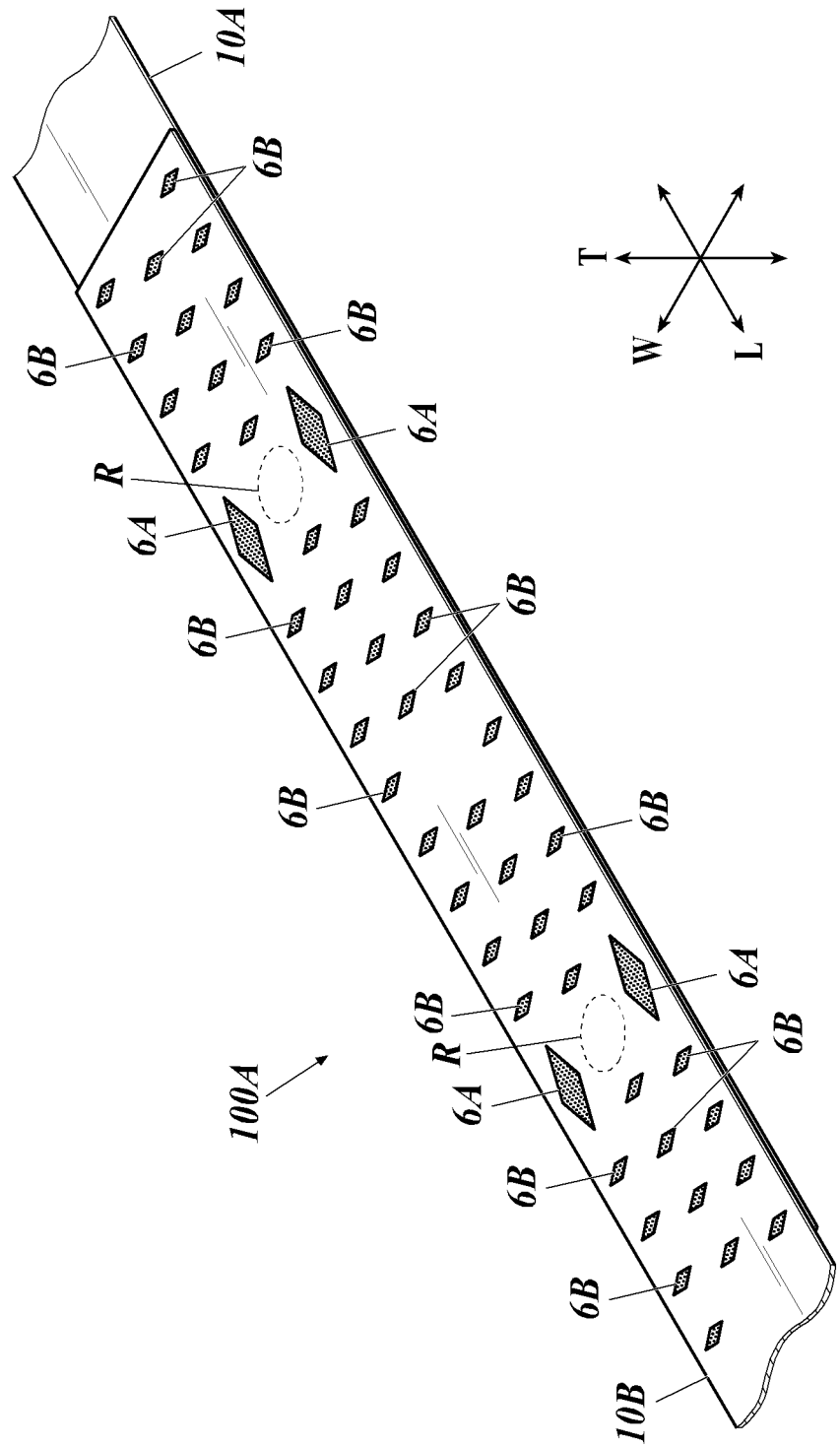
FIG. 6B is a perspective view of the connection structure for the superconductor wires which is partly modified, according to the second embodiment.

As shown in FIGS. 6A and 6B, a pair of the embedment materials 6A for reinforcement may be provided at multiple positions (for example, two positions) in the longitudinal direction L of the connection structure 100A for the superconductor wires, and multiple embedment materials 6B for reinforcement may be dispersedly provided in the longitudinal direction L in an area without the pair of the embedment materials 6A.

In that case, there may be areas R where the connection strength may be kept high against wire bending at multiple positions (two positions) of the connection structure 100A for the superconductor wires. Accordingly, the superconductive connection may be more stably kept in a good state, and the reliability may be improved further.

The same effects as the examples of FIGS. 5A and 5B may be obtained with the embedment materials 6B for reinforcement which are dispersedly provided.

Third Embodiment

In the connection structure 100 for the superconductor wires, the embedment material 6 for reinforcement is provided in the through holes 31, for example, though not limited.

Figure 7A:
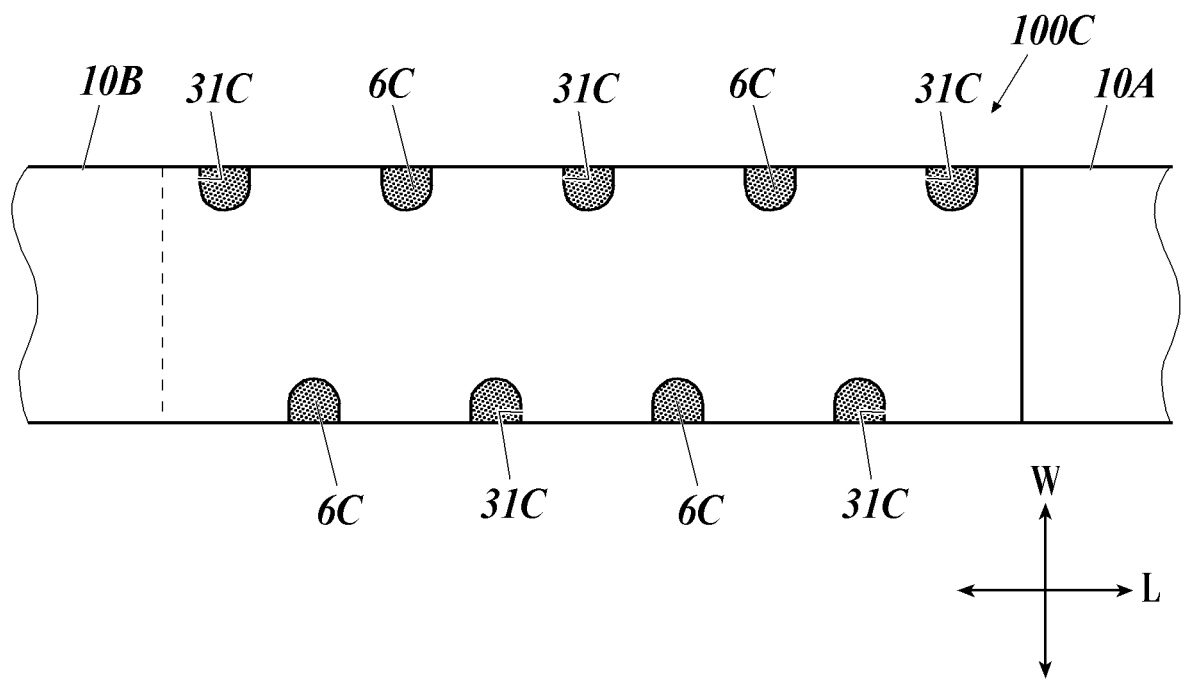
FIG. 7A is a plane view of the connection structure for the superconductor wires according to the third embodiment.

For example, the embedment material 6C for reinforcement may be provided in multiple notches 31C which are provided at the corresponding positions of the first and second superconductor wires 10A and 10B at the side edges on the both sides in the width direction W and which correspond to each other in shape and size, as in the connection structure 100C of the superconductor wires shown in FIG. 7A.

Notches 31C are formed in line along the side edges on the both sides in the width direction W of the first and second superconductor wires 10A and 10B, and penetrate the superconducting conductor layer 3 from the conjoined face to the back surface 12 of the base material 1.

The connection strength at the connected portion of the superconducting conductor layers 3 may be kept high with the embedment materials 6C for reinforcement in the notches 31C, similarly to the embedment material 6 for reinforcement, and the superconductive connection may be kept in a good state.

Further, enlargement or thickening of the connection structure 100C for the superconductor wires may be suppressed.

As the embedment materials 6C for reinforcement are provided at the both edges in the width direction W of the superconductor wires 10A and 10B, peeling or cracking due to curving at the central part in the width direction may be suppressed and the connection may be kept in a good state.

The embedment material 6C is formed with the same material and by the same method as the above-described embedment material 6 for reinforcement.

Figure 7B:
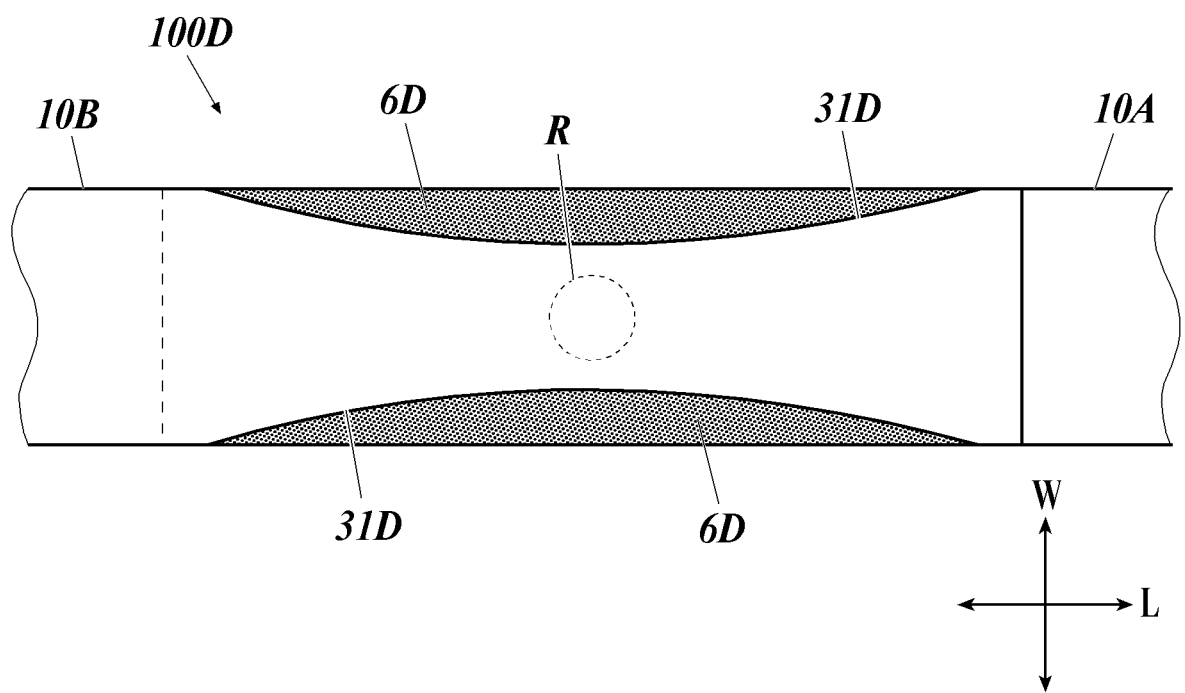
FIG. 7B is a plane view of the connection structure for the superconductor wires which is partly modified, according to the third embodiment.

As in the connection structure 100D for the superconductor wires shown in FIG. 7B, the embedment material 6D for reinforcement may be provided in the notches 31D which are formed at the corresponding positions of the first and second superconductor wires 10A and 10B at the side edges on the both sides in the width direction W, and the shape of the notches 31D and the embedment material 6D for reinforcement viewed from the direction perpendicular to the plane of the base material of the first and second superconductor wires 10A and 10B may be a shape which is longer in the longitudinal direction L and narrower toward the both ends.

The two notches 31D and the embedment materials 6D for reinforcement are preferably at the same length and at the same positions in the longitudinal direction L, and the shape of the inner periphery of the notch 31D is preferably a curved shape without corners.

With the embedment materials 6D for reinforcement formed in the notches 31D, effects similar to the embedment material 6C for reinforcement may be obtained, and even when bending is caused in the connection structure 100D for the superconductor wires, the connection strength of the superconducting conductor layers 3 of the first and second superconductor wires 10A and 10B may be kept high around the central part in the longitudinal direction of the embedment material 6D for reinforcement, and the superconductive connection may be kept in a good state.

Especially when the two embedment materials 6D for reinforcement are provided on the both sides in the width direction W, the superconductive connection may be kept in a good state in the area R which is between the central parts in the longitudinal direction L of the embedment materials 6D for reinforcement.

As the two embedment materials 6D for reinforcement are formed in a curved shape without corners, electric field concentration at corners is not caused.

The embedment material 6D for reinforcement is formed with the same material and by the same method as the above-mentioned embedment material 6 for reinforcement.

[Different Example of Formation of Embedment Material for Reinforcement (1)]

In all the above-mentioned connection structures 100 to 100D for the superconductor wires, for example, the embedment materials 6 to 6D for reinforcement fill the through holes 31 or the notches 31C, 31D which penetrate from the back surface 12 of the base material 1 of either one of the conjoined first and second superconductor wires 10A and 10B to the back surface 12 of the base material 1 of the other superconductor wire, though not limited.

The embedment material for reinforcement may is just necessarily provided from the first superconductor wire 10A to the second superconductor wire 10B in the thickness direction T.

Figure 8:
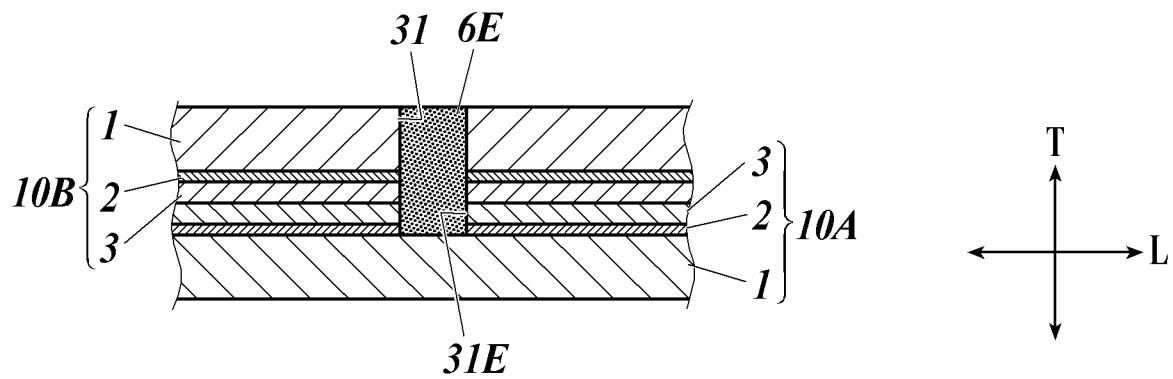
FIG. 8 is a cross-sectional view showing the different example of formation of an embedment material for reinforcement (1) in the longitudinal direction and in the thickness direction.

For example, as shown in FIG. 8, the through hole 31 which penetrates from the exposed surface of the superconducting conductor layer 3 to the back surface 12 of the base material 1 is formed in one superconductor wire (for example, the second superconductor 10B in the drawing), and blind hole 31E which penetrates partway from the exposed surface of the superconducting conductor 3 to the back surface 12 of the base material 1 is formed in the other superconductor wire (for example, the first superconductor 10A in the drawing). Those through hole 31 and blind hole 31E which correspond to each other in shape and size and which are provided at the corresponding positions may be integrated to form a blind hole as the superconductor wires are conjoined with each other, and the embedment material 6E for reinforcement fill the blind hole which is formed by integration.

In that way, as long as either one of the first and second superconductor wires 10A and 10B has a hole on the back surface 12 of the base material 1, the material of the embedment material 6E for reinforcement may fill the inside of it, and both of the first and second superconductor wires 10A and 10B do not necessarily have a hole on the back surface 12 of the base material 12.

With the above-described embedment material 6E for reinforcement, the connection strength at the conjoined portion of the superconducting conductor layers 3 may be kept high, and the superconductive connection may be kept in a good state, similarly to the embedment material 6 for reinforcement.

Further, enlargement or thickening of the connection structure for the superconductor wires may be suppressed.

The embedment material 6E for reinforcement is formed with the same material and by the same method as the above-described embedment material 6 for reinforcement.

In FIG. 8, the embedment material for reinforcement fills the through hole 31 and the blind hole 31E which is formed in the same shape and size as the through hole 31, for example. However, the shape of the holes is not limited, and the embedment material for reinforcement may fill the through holes shown in FIGS. 4 to 6 and blind holes which are formed in the same size and shape as those through holes, or alternatively, the embedment materials for reinforcement may fill the notches 31C and 31D and blind notches which are formed in the same size and shape as those notches 31C and 31D.

[Different Example of Formation of Embedment Material for Reinforcement (2)]

In both of the above-mentioned connection structures 100C and 100D for the superconductor wires, the embedment materials 6C and 6D fill the notches 31C and 31D which penetrate from the back surface 12 of the base material 1 of either one of the conjoined first and second superconductor wires 10A and 10B to the back surface 12 of the base material 1 of the other superconductor wire, for example, though not limited.

As described above, the embedment material for reinforcement is just necessarily provided from the first superconductor wire 10A to the second superconductor wire 10B in the thickness direction T.

Figure 9:
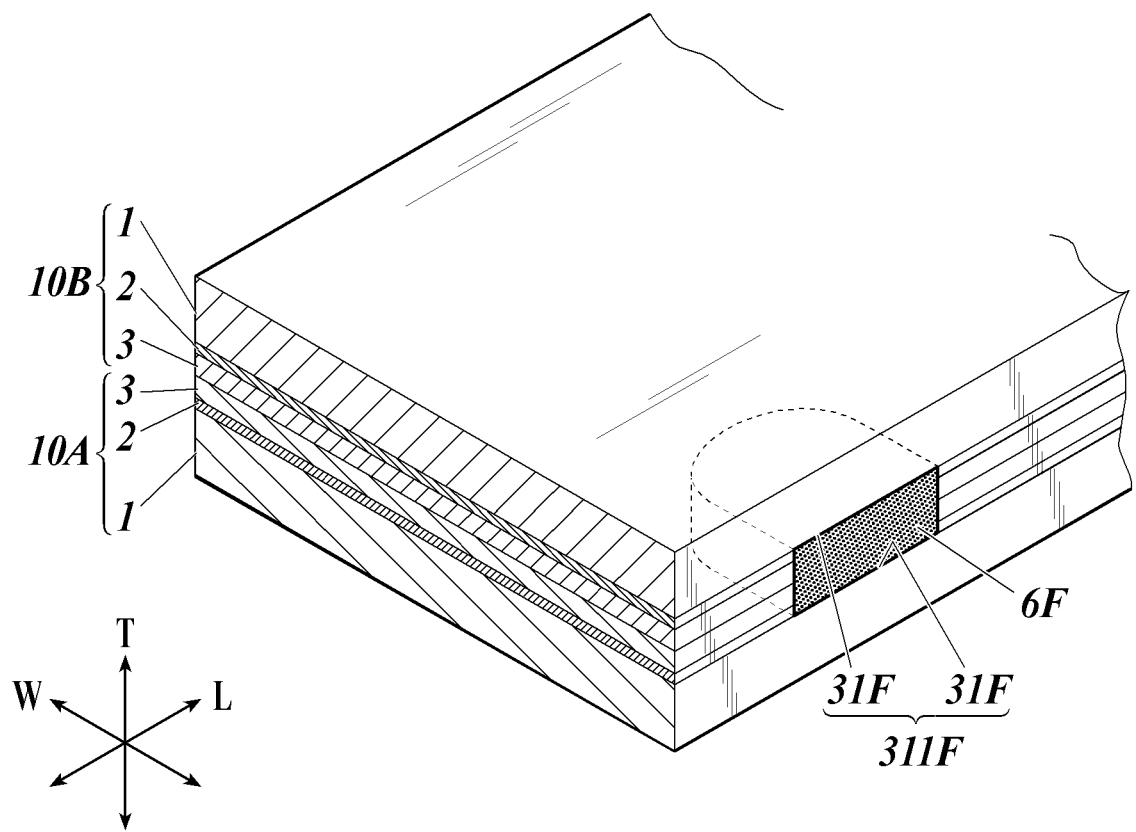
FIG. 9 is a perspective view of the different example of formation of an embedment material for reinforcement (2).

Accordingly, for example, as shown in FIG. 9, both of the first and second superconductor wires 10A and 10B have the blind notches 31F which penetrate from the exposed surface of the superconducting conductor layer 3 partway to the back surface 12 of the base material. Those blind notches 31F which correspond to each other in shape and size and which are provided at the corresponding positions are closed at the both edges in the thickness direction to form concaves 311F which open at one edge in the width direction W when the superconductor wires are conjoined, and the embedment material 6F for reinforcement fills the concaves 331F which are formed by integration.

When the embedment material for reinforcement is provided in the notches as described above, both of the first and second superconductor wires 10A and 10B do not necessarily have a hole on the back surface 12 of the base material 1, and the material of the embedment material 6F for reinforcement may fill the inside of the concave 311F which is open on one side in the width direction W.

With the embedment material 6F for reinforcement, the connection strength may be kept high at the conjoined portion of the superconducting conductor layers 3, and the superconductive connection may be kept in a good state.

Further, enlargement or thickening of the connection structure for the superconductor wires may be suppressed.

The embedment material 6F for reinforcement is formed with the same material and by the same method as the above-described embedment material 6 for reinforcement.

In FIG. 9, the embedment material for reinforcement fills the concaves 311F formed with the notches 31F which are formed in the same shape and size as the through holes 31, for example. However, the shapes of the holes are not limited, and the embedment material for reinforcement may fill the concaves which are formed in the same size and shape as the notches 31C and 31D.

[Others]

In the above-described embodiments, the first and second superconductor wires 10A and 10B have the intermediate layer 2, for example, but the embedment material for reinforcement may be formed in the superconductor wire without the intermediate layer 2.

Preferably, the embedment material for reinforcement is provided in the range from the surface of the superconducting conductor layer 3 to the level deeper than the face of the intermediate layer 2 on the side of the superconducting conductor layer 3. More preferably, it is provided in the range to the level deeper than the film forming surface 11 of the base material 1.

In the above-described embodiments, the superconducting conductor layers 3 are conjoined with the MOD method, for example, though not limited. For example, the chemical vapor deposition method (CVD method), the pulse laser deposition method (PLD method), or the metal organic chemical vapor deposition method (MOCVD method) may be employed.

INDUSTRIAL APPLICABILITY

The connection structure for the superconductor wires of the present invention is industrially applicable for a connection structure for superconductor wires which requires connection strength.

REFERENCE SIGNS LIST

1 Base Material (superconducting film forming base material)
2 Intermediate Layer
3 Superconducting Conductor Layer (oxide superconducting conductor layer)
4, 4a Internal Protection Layer
5 External Protection Layer
6 to 6D Embedment Material for Reinforcement
10 Superconductor Wire
10A First Superconductor Layer
10B Second Superconductor Layer
11 Film Forming Surface
12 Back Surface
31 Through Hole
31E Blind Hole
31C, 31F Notch
311F Concave
61 Embedment Material Layer
100 to 100D Connection Structure for Superconductor Wires
L Longitudinal Direction
R Area
T Thickness Direction
W Width Direction

The invention claimed is:

1. A connection structure for two superconductor wires including respective oxide superconducting conductor layers each formed on one side of a base material,
  wherein the respective oxide superconducting conductor layers are conjoined with each other while facing each other at a connected end of each of the two superconductor wires,
  wherein an embedment material for reinforcement is provided from one of the two superconductor wires to the other one of the two superconductor wires in a thickness direction of the two superconductor wires at the connected end of each of the two superconductor wires, and
  wherein the embedment material for reinforcement fills a hole or a notch penetrating through the back surface, which penetrates at least one of the two superconductor wires through a back surface opposite to a film forming surface of at least one of the respective oxide superconductor conducting layers of the base material, and
  wherein the embedment material for reinforcement is formed to be a layer on the back surface around the hole or the notch.

2. The connection structure for the two superconductor wires according to claim 1, wherein the embedment material for reinforcement is positioned at both edges in a width direction of the two superconductor wires.

3. The connection structure for the two superconductor wires according to claim 1, wherein a shape of the embedment material for reinforcement viewed from a direction perpendicular to a plane of the base material of the two superconductor wires is a shape longer in the longitudinal direction and narrower toward both ends in the longitudinal direction.

4. The connection structure for the two superconductor wires according to claim 3, wherein the embedment material for reinforcement, which is in the shape longer in the longitudinal direction of the two superconductor wires and narrower toward the both ends in the longitudinal direction, is formed at both edges in a width direction of the two superconductor wires.

5. The connection structure for the two superconductor wires according to claim 1, wherein the embedment material for reinforcement is formed with a resin or a low-melting metal.

6. The connection structure for the two superconductor wires according to claim 1, wherein a shear tolerance of the embedment material for reinforcement is larger than a shear tolerance of the oxide superconducting conductor layers.

7. The connection structure for the two superconductor wires according to claim 1, wherein the hole includes multiple holes, and the layer of the embedment material for reinforcement on the back side is continuously extended over the multiple holes.

* * * * *